Figure 1:
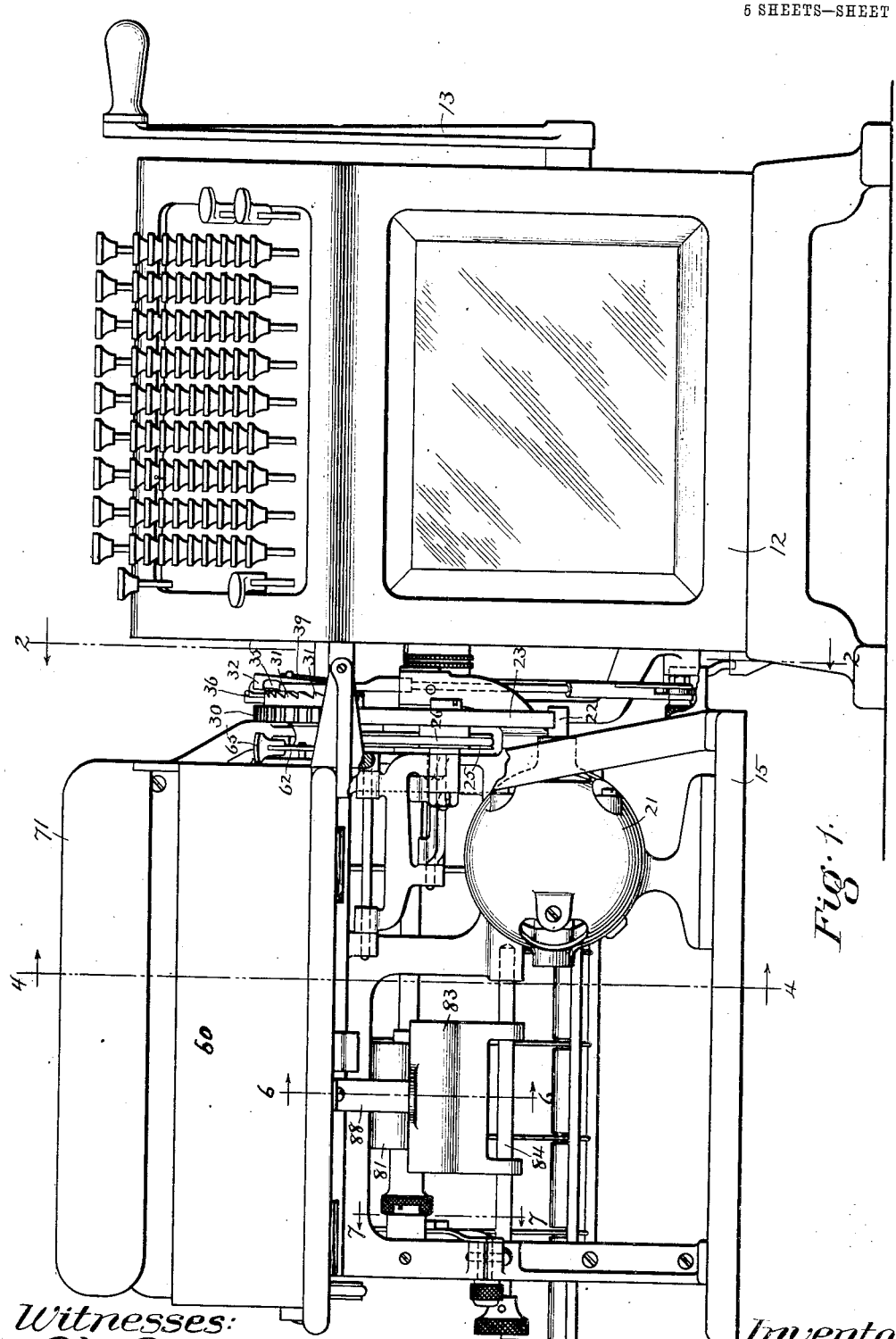

C. H. MARSTON & H. H. CUMMINGS.
APPARATUS FOR MARKING CHECKS.
APPLICATION FILED AUG. 7, 1908.

913,299.

Patented Feb. 23, 1909.
5 SHEETS—SHEET 1.

Witnesses:
P. H. Pezzetti
A. E. Rutt.

Inventors:
C. H. Marston
H. H. Cummings
by Hugh Brown Quimby & May
Attys.

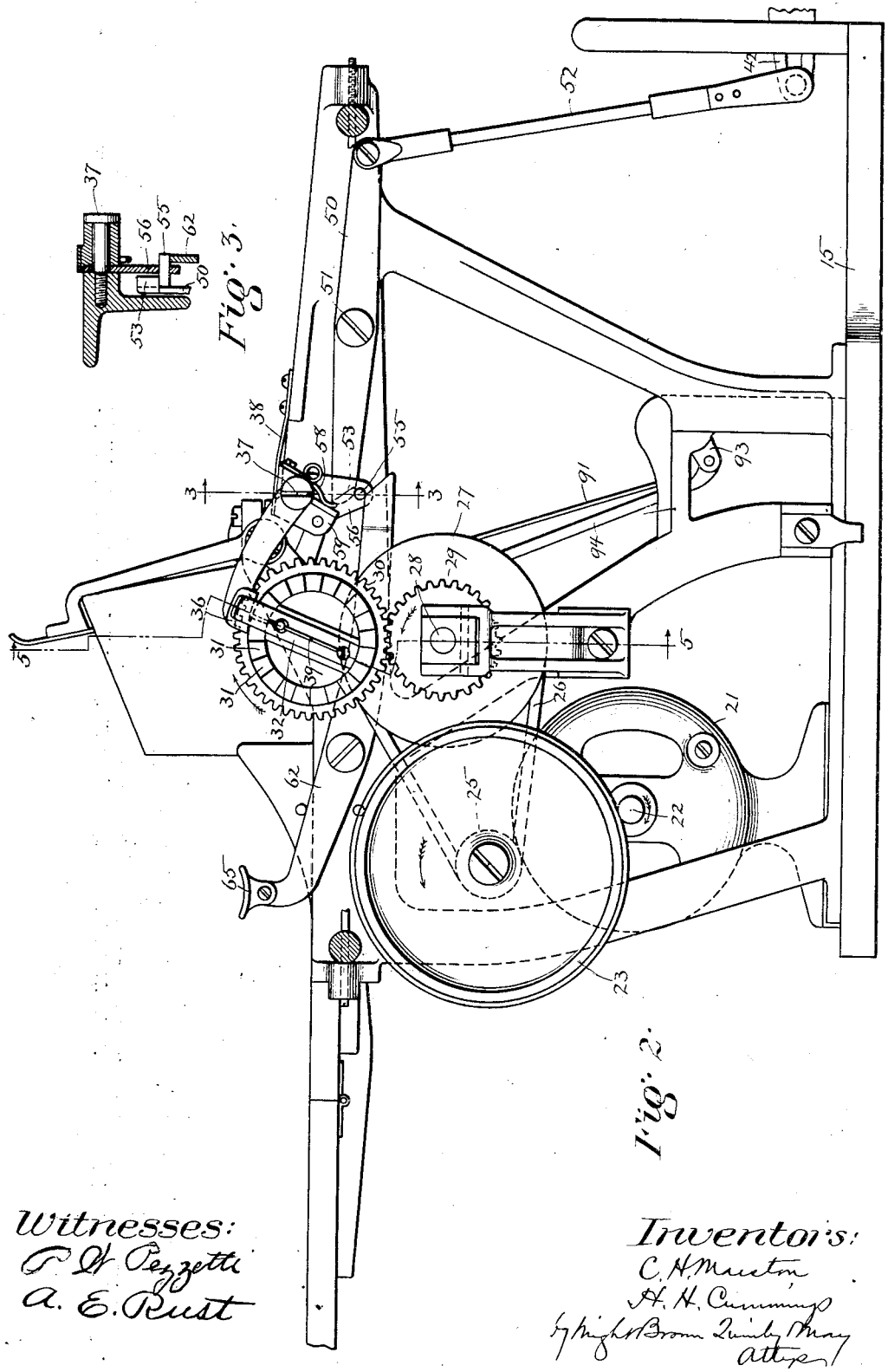

C. H. MARSTON & H. H. CUMMINGS.
APPARATUS FOR MARKING CHECKS.
APPLICATION FILED AUG. 7, 1908.

913,299.

Patented Feb. 23, 1909.
5 SHEETS—SHEET 3.

Witnesses:
Inventors:

C. H. MARSTON & H. H. CUMMINGS.
APPARATUS FOR MARKING CHECKS.
APPLICATION FILED AUG. 7, 1908.

913,299.

Patented Feb. 23, 1909.
5 SHEETS—SHEET 4.

Witnesses:
P. W. Pezzetti
A. E. Rust

Inventors:
C. H. Marston
H. H. Cummings
by Wright Brown Quinby May
Attys.

C. H. MARSTON & H. H. CUMMINGS.
APPARATUS FOR MARKING CHECKS.
APPLICATION FILED AUG. 7, 1908.

913,299.

Patented Feb. 23, 1909.
5 SHEETS—SHEET 5.

Witnesses:
C. H. Pezzetti
A. E. Rust.

Inventors:
C. H. Marston
H. H. Cummings
by Wright Brown Quinby May
Attys.

UNITED STATES PATENT OFFICE.

CHARLES H. MARSTON, OF READING, AND HENRY H. CUMMINGS, OF NEWTON, MASSACHUSETTS; SAID CUMMINGS ASSIGNOR TO SAID MARSTON.

APPARATUS FOR MARKING CHECKS.

No. 913,299.     Specification of Letters Patent.     Patented Feb. 23, 1909.

Application filed August 7, 1908. Serial No. 447,358.

REISSUED

*To all whom it may concern:*

Be it known that we, CHARLES H. MARSTON, of Reading, in the county of Middlesex and State of Massachusetts, and HENRY H. CUMMINGS, of Newton, in the county of Middlesex and State of Massachusetts, have invented certain new and useful Improvements in Apparatus for Marking Checks, of which the following is a specification.

This invention relates to apparatus for imprinting on the backs of bank checks the usual printed information which is placed on the check after its reception in the bank where it is payable, the printed information being usually applied by a rubber printing member, giving the name of the bank, the name of its cashier or other officer, the date, etc.

The invention has special reference to apparatus of the general character set forth in Letters Patent of the United States, No. 865,050, dated September 3, 1907. The apparatus disclosed by said patent comprises an adding machine which is caused to print on a record sheet the amounts represented by the checks handled during a given period, the adding machine being provided with keys which set the printing characters of the machine, and with an oscillatory lever which is manually moved in one direction by the operator, and is automatically moved by a spring or otherwise in the opposite direction when the operator releases it. The operator facing the machine, takes up the checks one by one, holding each check in one hand while manipulating the keys of the adding machine to adapt the machine to print the amount represented by the check. After the machine has been set to print the amount of one check, the operator moves the lever forward, and thus causes an impression by the printing mechanism of the amount of the check on the record sheet. When the operator releases the lever, it is automatically returned to its starting position, and the record sheet is at the same time fed along, this operation being repeated for each check. The said patent also discloses a printing couple, the members of which are rotated during one movement of the said operating lever, and remain at rest during the opposite movement so that the printed indorsements are applied to the checks at the same time that the adding machine is being operated to record the amounts of the checks, thus saving the delay and loss of time involved when a separate operation apart from the adding machine is required for affixing the printed indorsements. In said patented apparatus the printing mechanism is operated by the power exerted by the operator in moving the lever of the adding machine, as above described.

The present invention has for its object, first, to provide a check-marking apparatus, the printing mechanism of which shall be operated by power independent of that applied to the lever of the adding machine, the printing mechanism being operated by power, preferably supplied by a small electric motor, which is normally disconnected from the printing mechanism, and is adapted to be connected with said mechanism by the forward movement of the lever of the adding machine, or by means independent of said lever.

The invention also has for its object to provide certain improvements relating to the printing mechanism, some of said improvements being capable of use in the type of check-marking apparatus shown in the said Letters Patent.

The invention consists in the several improvements which we will now proceed to describe and claim.

Figure 4:
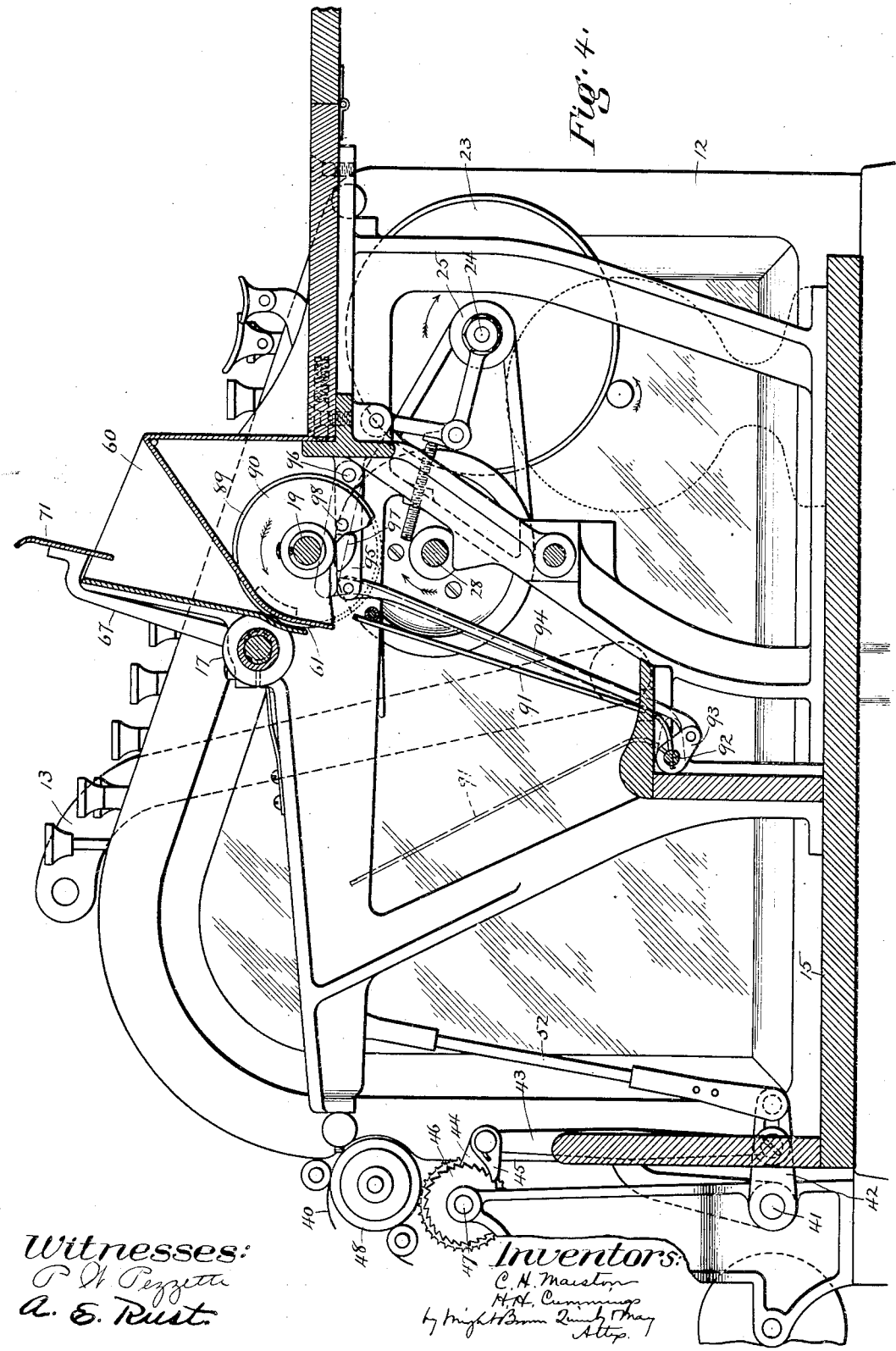
Figure 5:
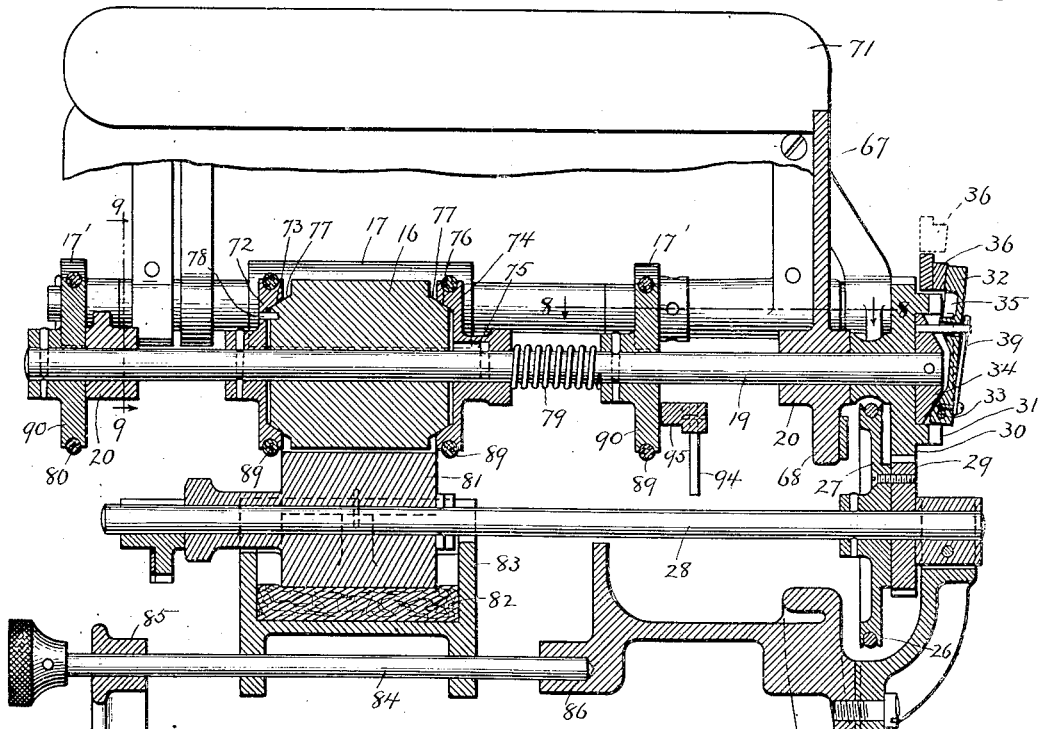
Figure 7:
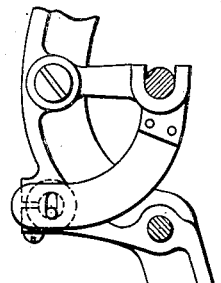
Figure 8:
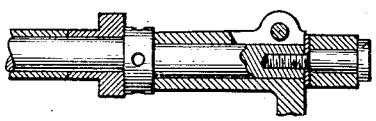
Figure 9:
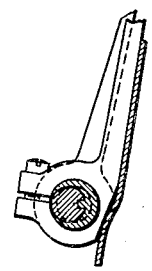
Figure 6:
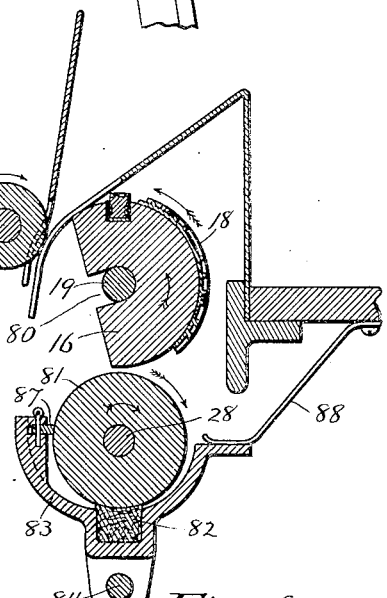
Figure 10:
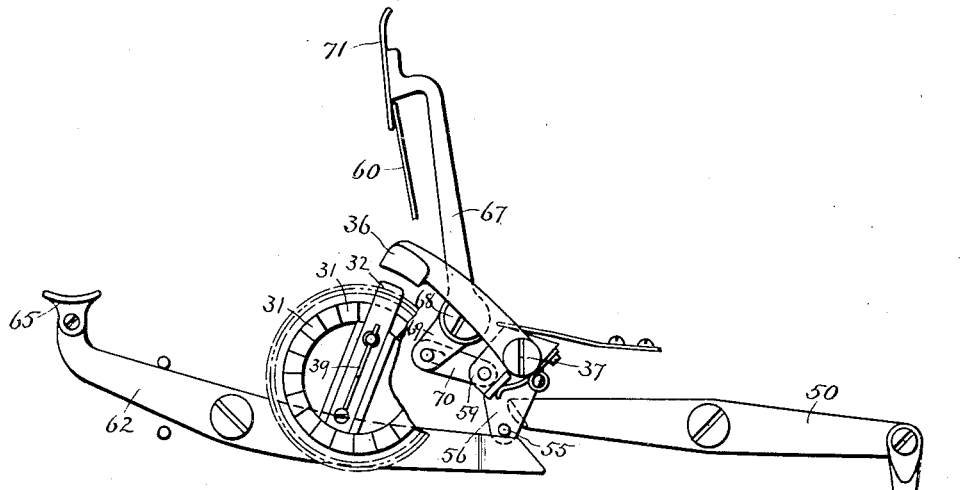
Figure 11:
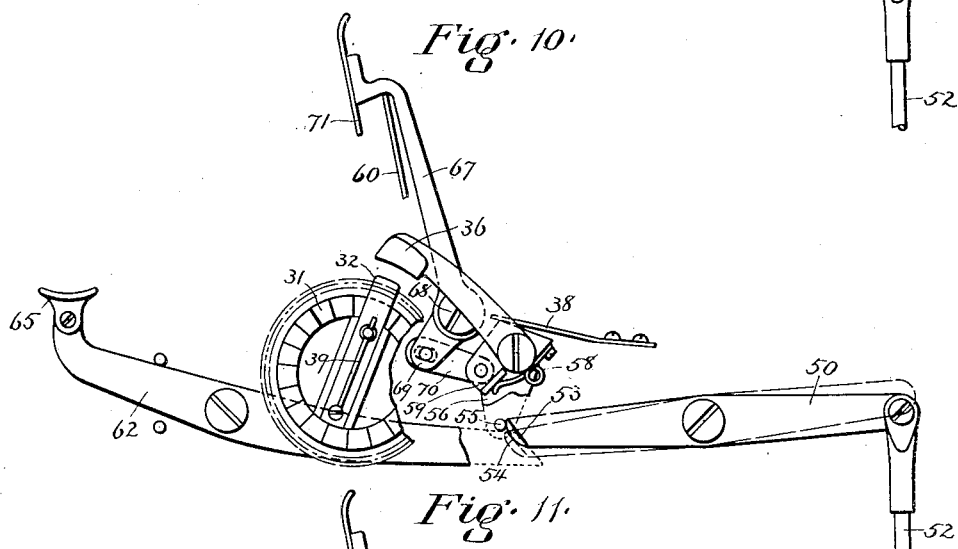
Figure 12:
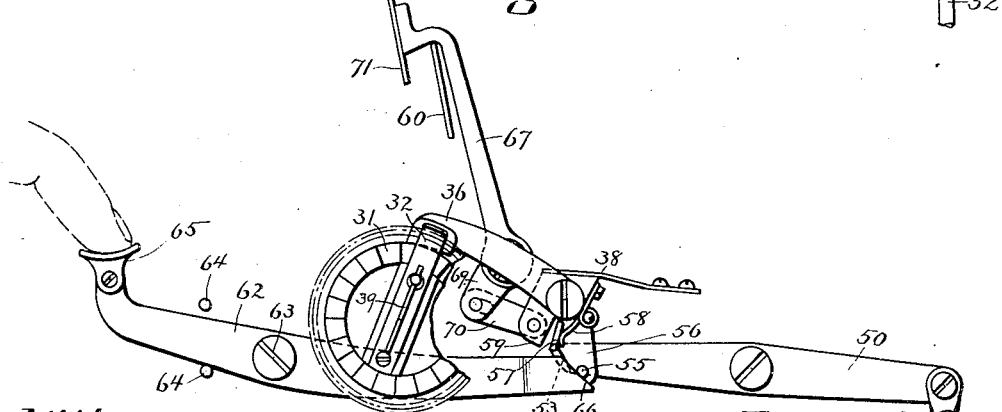

Of the accompanying drawings forming a part of this specification, Figure 1 represents a front elevation of a check-marking apparatus embodying our invention, and an adding machine with which the marking apparatus is connected. Fig. 2 represents a section on line 2—2 of Fig. 1, and an elevation of the mechanism at the left of said line. Fig. 3 represents a section on line 3—3 of Fig. 2. Fig. 4 represents a section on line 4—4 of Fig. 1, and an elevation of the mechanism at the right of said line. Fig. 5 represents a section on line 5—5 of Fig. 2. Fig. 6 represents a section on line 6—6 of Fig. 1. Fig. 7 represents a section on line 7—7 of Fig. 1. Fig. 8 represents a section on line 8—8 of Fig. 5. Fig. 9 represents a section on line 9—9 of Fig. 5. Figs. 10, 11 and 12 represent side elevations of portions of the mechanism for connecting the printing mechanism with the motor.

The same characters of reference indicate the same parts in all the figures.

In the drawings 12 represents the casing of an adding machine which may be of any suitable form, the form here shown being that of the Burroughs adding machine.

13 represents the oscillatory operating lever of the machine, said lever being normally held by a spring or otherwise, as usual, in the position shown in Fig. 4, and adapted to be manually moved by the operator to a forward position, the movement of the lever to the last mentioned position causing the printing characters of the machine to make an impression on a record sheet at the back of the machine. When the lever is released, after being pulled forward by the operator, it is returned by its controlling spring to its normal position.

To the casing 12 is affixed a suitable frame adapted to support the printing mechanism hereinafter described, said frame comprising a base 15, and suitable frame parts associated therewith, the frame being attached to the end of the casing 12 opposite the end at which the lever 13 is located.

16 represents the impression member or roll, and 17 the bed member or roll of a printing couple, these members being rotated simultaneously in opposite directions by the mechanism hereinafter described.

The impression member is provided with one or more segmental forms or plates 18, which may be of elastic material and adapted to impress the printed indorsement upon the under surface of a check passed between the two members. The impression member 16 is mounted on a shaft 19 which is journaled in bearings 20 on the supporting frame.

21 represents the casing of a small electric motor which is preferably mounted on the base 15, and may be connected by any suitable means with a source of electricity such as an incandescent lamp socket. The shaft 22 of the motor rotates in frictional contact with a wheel 23, the shaft 24 of which is journaled in a bearing on the supporting frame, and is provided with a pulley 25, which is connected by a belt 26 with a pulley 27 on a shaft 28, which is also journaled in bearings on the supporting frame. To the shaft 28 is affixed a gear 29 meshing with a gear 30, which is loosely mounted on the shaft 19. The gear 30 carries a suitable clutch member which is adapted to engage a complemental clutch member carried by the shaft 19, the arrangement being such that when said clutch members are connected, rotation will be imparted from the shaft 28 to the impression roll shaft 19 through the gears 29 and 30. When said clutch members are separated, which is their normal condition, the rotation of the impression roll shaft 19 stops. In this embodiment of our invention, the clutch member on the loose gear 30 is an annular series of radial teeth 31 formed on one side of the loose gear 30. The clutch member carried by the impression roll shaft is an arm 32 pivoted at 33 to ears formed on a head 34 which is rigidly affixed to the impression roll shaft 19. The swinging end portion of the arm 32 is provided with a tooth 35 adapted to engage either of the radial teeth 31 when the arm 32 is swung inwardly from the position shown in Fig. 5 toward the head 34, the arm being normally held in the position shown in Fig. 5 by a detent member 36, so that the clutch teeth 31 and 35 are normally disengaged, the impression roll shaft being, therefore, normally at rest. The detent 36 is an arm which is pivoted at 37, and is normally held in the depressed position shown in Figs. 2 and 12 by means of a spring 38, so that the detent normally bears upon the outer surface of the annular flange on which the radial teeth 31 are formed. The arm 32 is normally pressed inward to engage a tooth 31 by means of a spring 39 when the detent 36 is raised, as shown in Figs. 10 and 11, and by dotted lines in Fig. 5. It will be seen, therefore, that when the detent 36 is raised, the tooth 35 of the arm 32 moves into engagement with one of the teeth 31, thus establishing a connection between the loose gear 30 and the impression roll shaft 19. When the detent 36 is depressed, as shown in Figs. 2 and 12, and by full lines in Fig. 5, it encounters the outer end of the arm 32 and forces said arm to the position shown in Fig. 5 in disconnecting the members of the clutch. The detent 36 is wedge-shape, or has an inclined side face which encounters the swinging end of the arm 32 whenever the rotation of the gear 30 brings the arm 32 to the point occupied by the detent 36. When the arm encounters the detent and is displaced thereby, the rotation of the arm of the impression roll shaft ceases, the arm remaining in contact with the detent, and the impression roll remaining at rest until the detent is again raised to permit the engagement of the clutch members.

From the foregoing, it will be seen that the printing mechanism is operated only when the detent 36 is raised and becomes inoperative, and remains at rest when the detent is depressed.

The adding machine is provided with mechanism for feeding a record sheet 40 step by step, each feed movement of the record sheet being effected during the return movement of the lever 13 to its rearward position after it has been pulled forward and released by the operator. The said mechanism includes a rock shaft 41 and mechanism for rocking the same. Said mechanism forms no part of our invention, and therefore is not here shown in its entirety. The said mechanism includes an arm 42 which is affixed to the rock shaft 41, and is connected by a rod 43 with an arm 44 which carries a pawl 45 engaging a ratchet 46 on a shaft 47, which imparts a step-by-step rotation to a feeding and impression roller 48.

We have utilized the rock shaft 41 and its arm 42 as a part of the mechanism for connecting the clutch members above described, and thus imparting rotation to the impression roll shaft 19, our added mechanism including suitable connections between the arm 42 and the detent 36, shown clearly in Figs. 2, 10, 11 and 12.

50 represents a lever pivoted at 51 to the supporting frame. One arm of the lever is connected by a rod 52 with the adding machine arm 42. The other arm of the lever 50 carries an ear 53 which projects laterally from the lever (see Fig. 3), and has an inclined curved outer face 54 (Fig. 11). The lever 50 is normally in the position shown in Fig. 3, its face 54 overhanging a stud 55 on an arm 56 which is mounted to oscillate on the pivot stud 37, on which the detent 36 is mounted, the detent and the arm 56 being adapted to oscillate to a limited extent independently of each other. The arm 56 is provided with an ear 57 which is yieldingly held by a spring 58 against an arm 59 affixed to the detent 36. The normal position of the lever 50, shown in Fig. 3, is the position which the lever occupies while the lever 13 of the adding machine is being moved forward by the operator, and until the lever 13 is returned to its rearward position.

The rock shaft 41 and its arm 42 are normally in the position shown in Fig. 4, the rock shaft being moved from said position by mechanism actuated when the lever 13 returns to its rearward position in such manner as to raise the arm 42 from the position shown in Fig. 4, thus raising the rear arm of the lever 50 and depressing the forward arm having the ear 53, and causing the inclined face 54 of said ear to act on the stud 55 and move the arm 56 forward against the arm 59, thus raising the detent, as shown in Fig. 11, and causing it to release the clutch arm 32, the tooth 35 carried by said arm being allowed to engage one of the clutch teeth 31 of the loose gear 30. The detent 36 remains in its raised position only while the ear 53 is in contact with the stud 55, the spring 38 acting as soon as the ear 53 passes below the stud 55, as shown by dotted lines in Fig. 11, to force the detent downwardly into position to displace the clutch lever 32.

In practice, the detent lever 36 remains raised during less than a complete rotation of the impression roll shaft 19, so that it is in position to displace the clutch arm 32 when the impression roll has made a complete rotation.

When the detent is depressed, its arm 59 forces the arm 56 backwardly so that the stud 55 passes over the upper end of the ear 53 while the lever 50 is in the dotted line position shown in Fig. 11. When the lever 50 returns to its normal position, shown in Fig. 3, the inclined face of the ear 53 moves upwardly in front of the stud 55, the latter yielding to the ear and swinging backwardly until the ear passes above it, the spring 58 then acting to return the arm 56 and stud 55 to the position under the ear 53 shown in Fig. 3, so that the parts are again ready to act to raise the detent when the lever 50 is again moved from its normal position.

It will be seen from the foregoing that after each forward movement of the adding machine lever 13, and its release and automatic return to its rearward position, the detent 36 is raised, and the impression roll shaft 19 is connected with the motor until it has made a complete rotation, and is then automatically disconnected from the motor and stops.

A hopper 60 guides the checks to the nip of the printing couple rolls, the arrangement being such that a check dropped in the hopper will be engaged by said rolls and drawn between them, the check being impressed by the printing characters on the impression roll, and then delivered through the contracted throat 61 of the hopper.

It will be observed that the operation of the printing mechanism is attended by practically no resistance to the movement of the adding machine lever, the force required to raise the detent 36 and thus permit the connection of the impression roll shaft to the motor being practically inappreciable.

To enable the adding machine to be operated without operating the printing mechanism, we provide a lever 62 pivoted at 63 to the supporting frame which is adapted to play between fixed stop pins 64. The outer arm of the lever 62 is provided with a finger key 65 adapted to be depressed by the operator, as indicated in Fig. 12. The opposite end of the lever is provided with an inclined face 66 which bears against the stud 55 on the arm 56 when the key is depressed, and forces said arm and stud backwardly so that the stud is out of the path of the ear 53; hence, the previously described movements of the lever 50 have no effect upon the detent arm, the latter remaining in its depressed position, and holding the clutch arm 32 out of engagement with the gear 30. When the key 65 is released, the lever 62 assumes the position shown in Figs. 2, 10 and 11, so that its rear end is below the stud 55.

We have provided means whereby the printing mechanism may be operated independently of the adding machine whenever this is desirable. Said means, as here shown, comprise a lever pivoted at 68 to the supporting frame, and having an upwardly projecting longer arm 67 located behind the hopper 60, and a downwardly projecting shorter arm 69 which is connected by a link 70 with the arm 59 of the detent 36. The arm 67 is normally in the position shown in Figs. 2, 4, 10 and 11. When the said arm is moved to the position shown in Fig. 10, the shorter arm 69 acts through the link 70 to move the arm 59 and detent 36 to raise the detent, thus permitting the connection of the clutch members so that the impression roll is rotated. The arm 67 is provided with an elongated ear 71 (see Figs. 1 and 5), which extends practically the entire length of the hopper 60, and is located a little in advance of the rear wall of the hopper, as shown in Fig. 4, so that the operator's hand in inserting a check in the hopper may readily move the lever arm 67 from the position shown in Figs. 4 and 12 to that shown in Fig. 10, and thus cause the raising of the detent and the raising of the clutch members.
When the pressure of the operator's hand is removed from the ear 71, the lever 67 returns to its normal position, permitting the depression of the detent 36.

The impression roll 16 is, as above stated, preferably secured detachably to its shaft 19, the connecting arms being shown in Fig. 5, and has a wheel 72 affixed to the shaft 19 and provided at its inner side with a recess having a beveled margin 73, a similar wheel 74 mounted to slide on the shaft 19 and rotatively engaged with the latter by means of a key 75 on said shaft engaging the groove in the hub of the wheel, said wheel having in its inner side a recess with a beveled margin 76.
The ends of the impression roll are provided with projections having beveled concentric margins 77, which fit the margins of the recesses in the wheels 72 and 74. One end of the impression roll has a dowel pin 78 adapted to enter an orifice formed for its reception in the wheel 72, to insure the proper relative position of the impression roll on its shaft. The slidable wheel 74 is pressed yieldingly against the corresponding end of the impression roll by the spring 79. When it is desired to remove the impression roll, the wheel 74 is moved away from the impression roll, the latter being free to be moved out of engagement with the wheel 72 and from the shaft 19. One side of the impression roll is cut away, as shown in Fig. 6, and provided with a recess 80 which receives the shaft 19. This construction permits the impression roll to be applied to and removed from the shaft by a lateral movement.

81 represents an inking roll affixed to the shaft 28, and rotated by the latter in contact with an inking pad 82 contained in a recess in the bottom of a trough 83. Said trough is mounted to have a slight oscillating motion on a removable pin or stud 84 supported by sockets 85, 86 on the supporting frame. The trough is provided with a doctor-blade or scraper 87 which bears against one side of the periphery of the inking roll and removes the surplus of ink therefrom. A spring 88 secured at one end to the supporting frame, and bearing at one end on a flange formed on the trough 83 presses the scraper 87 yieldingly against the periphery of the inking roll.

The wheels 72 and 74 which engage the ends of the impression roll, are provided with frictional bands or tires 89, which frictionally engage the periphery of the bed roll 17, and constitute a friction drive for the bed roll. The shaft 19 is preferably provided with two additional wheels 90, each having a rubber semi-frictional tire 89, these also engaging the periphery of the bed roll 17.

91 represents a flap which is located below the outlet 61 of the hopper, and is adapted to oscillate between the full and dotted line positions shown in Fig. 4, the flap being normally in the full line position so that a check emerging from the hopper will lie against it, and will be carried over by the movement of the arm to the dotted line position, and dropped upon the base 15. The flap 91 is affixed to a rock shaft 92, which is journaled in bearings in the supporting frame, and has an arm 93 which is connected by a rod 94 with an arm 95 pivoted at 96 to an ear on the supporting frame. The arm 95 is provided with a projection 97 having a curved lower edge formed and arranged to be engaged by a stud 98 which projects from one side of one of the wheels 90 on the impression roll shaft 19. The flap 91 stands normally in the position shown by full lines in Fig. 4, the projection 97 being so arranged that when the stud 98 is carried in the direction indicated by the arrow shown on the wheel 90 in Fig. 4, said stud will strike the under side of the projection 97 and raise the arm 95 to the position shown in dotted lines, thereby turning the rock shaft 92, through the rod 94, and throwing the flap to the position indicated by dotted lines. When the stud 98 passes from under the projection 97, the arm 95 and the flap return to their normal positions.

We claim:

1. In combination, an adding machine a printing couple, a motor, connections between the motor and the printing couple, including a clutch, means controlled by an operator for causing the engagement of the clutch members, and automatic means for separating the clutch members.

2. In combination, an adding machine a printing couple, a motor, connections between the motor and the printing couple, including a clutch, the members of which are adapted to automatically engage, a detent adapted to separate said members, and means for moving said detent to alternately permit the engagement and cause the disconnection of the clutch members.

3. In combination, a printing couple, a motor, connections between the motor and the printing couple including a clutch, an adding machine and mechanism intermediate the said clutch and a movable part of the adding machine for alternately causing the engagement of the clutch members and separating the same.

4. In combination, a printing couple, a motor, connections between the motor and the printing couple, including a clutch, one member of which is yieldingly mounted and adapted to automatically engage the other member, a detent adapted to separate said members, an adding machine, and connections between said detent and a movable part of the machine whereby the detent is caused to alternately displace and release the yielding clutch member.

5. In combination, a printing couple, a motor, connections between the motor and the printing couple, including a clutch, an adding machine, mechanism intermediate the said clutch and a movable part of the adding machine for alternately causing the engagement of the clutch members and separating the same, and means for making said intermediate mechanism inoperative, to permit the operation of the adding machine only.

6. In combination, a printing couple, a motor, connections between the motor and the printing couple, including a clutch, an adding machine, mechanism intermediate the said clutch and a movable part of the adding machine for alternately causing the engagement of the clutch members and separating the same, and auxiliary mechanism for causing the engagement and separation of the clutch members independently of the adding machine.

7. In combination, a printing couple, a motor, connections between the motor and the printing couple, including a clutch, one member of which is yieldingly mounted and adapted to automatically engage the other member, a detent adapted to separate said members, an adding machine, connections between said detent and a movable part of the machine whereby the detent is caused to alternately displace and release the yielding clutch member, and a key lever adapted to make said connections inoperative.

8. In combination, a printing couple, a motor, connections between the motor and the printing couple, including a clutch, one member of which is yieldingly mounted and adapted to automatically engage the other member, a detent adapted to separate said members, an adding machine, connections between said detent and a movable part of the machine whereby the detent is caused to alternately displace and release the yielding clutch member, an auxiliary operating lever located adjacent to the printing couple, and connections between said lever and the detent whereby the latter may be operated independently of the adding machine.

9. In combination, an adding machine, a printing couple, a motor, and means connected with a movable portion of the adding machine for controlling the operation of the printing couple by said motor In testimony whereof we have affixed our signatures, in presence of two witnesses

CHARLES H. MARSTON.
HENRY H. CUMMINGS.

Witnesses:
 VICTOR W. COLLIER,
 AUG. C. JORDAN.